(12) United States Patent
Gandhi et al.

(10) Patent No.: US 7,478,099 B1
(45) Date of Patent: Jan. 13, 2009

(54) METHODS AND APPARATUS FOR COLLECTING DATABASE TRANSACTIONS

(75) Inventors: Rajesh K. Gandhi, Shrewsbury, MA (US); Keith Alan Carson, Jr., Hopkinton, MA (US); Venkata R. Tiruveedi, Franklin, MA (US); Anoop George Ninan, Milford, MA (US); Samuil Shmuylovich, Framingham, MA (US); Boris Farizon, Westborough, MA (US)

(73) Assignee: EMC Corporation, Hopkinton, MA (US)

( * ) Notice: Subject to any disclaimer, the term of this patent is extended or adjusted under 35 U.S.C. 154(b) by 358 days.

(21) Appl. No.: 11/476,521

(22) Filed: Jun. 28, 2006

(51) Int. Cl.
*G05F 7/00* (2006.01)
(52) U.S. Cl. ......................... 707/10; 707/102
(58) Field of Classification Search .............. 707/1–10, 707/100–102
See application file for complete search history.

(56) References Cited

U.S. PATENT DOCUMENTS

| | | | |
|---|---|---|---|
| 6,973,491 B1 * | 12/2005 | Staveley et al. | 709/224 |
| 7,376,948 B2 * | 5/2008 | Armstrong et al. | 718/1 |
| 7,412,409 B2 * | 8/2008 | Aliabadi et al. | 705/26 |
| 2003/0220987 A1 * | 11/2003 | Pearson | 709/220 |
| 2005/0209876 A1 * | 9/2005 | Kennis et al. | 705/1 |

* cited by examiner

*Primary Examiner*—Wilson Lee
(74) *Attorney, Agent, or Firm*—Chapin IP Law, LLC; Barry W. Chapin, Esq.

(57) ABSTRACT

A system receives a dataset for storing in a staging database. The dataset contains network management data collected from a managed resource. The system disengages a connection between the staging database and a production database, and stores the dataset in the staging database. The system then re-engages the connection between the staging database and the production database.

19 Claims, 7 Drawing Sheets

204 RECEIVE A DATASET FOR STORING IN A STAGING DATABASE, THE DATASET CONTAINING NETWORK MANAGEMENT DATA COLLECTED FROM A MANAGED RESOURCE

205 RECEIVE NOTIFICATION THAT A PLURALITY OF PARTITIONS IS TO BE TRANSMITTED TO THE STAGING DATABASE

OR

206 IDENTIFY A PLURALITY OF FIRST TABLES WITHIN THE PRODUCTION DATABASE THAT CORRESPOND TO THE DATASET

207 CREATE A PLURALITY OF SECOND TABLES IN THE STAGING DATABASE THAT MIRROR THE PLURALITY OF FIRST TABLES WITHIN THE PRODUCTION DATABASE

OR

208 IDENTIFY A PLURALITY OF FIRST TABLES WITHIN THE PRODUCTION DATABASE THAT DO NOT CORRESPOND TO THE DATASET

209 CREATE A PLURALITY OF ALIAS TABLES IN THE STAGING DATABASE, THE PLURALITY OF ALIAS TABLES CORRESPONDING TO THE PLURALITY OF FIRST TABLES IN THE PRODUCTION DATABASE

*FIG. 3*

```
┌─────────────────────────────────────────────────────────────────────────┐
│ 216 RE-ENGAGE THE CONNECTION BETWEEN THE STAGING DATABASE AND THE       │
│ PRODUCTION DATABASE                                                      │
│                                                                          │
│   ┌───────────────────────────────────────────────────────────────────┐ │
│   │ 217 DETECT WHEN ALL PARTITIONS WITHIN THE PLURALITY OF            │ │
│   │ PARTITIONS HAVE BEEN SUCCESSFULLY COMMITTED TO THE STAGING        │ │
│   │ DATABASE                                                           │ │
│   └───────────────────────────────────────────────────────────────────┘ │
│                                    ▼                                     │
│   ┌───────────────────────────────────────────────────────────────────┐ │
│   │ 218 RELEASE A LOCK ON THE PRODUCTION DATABASE SUCH THAT           │ │
│   │ MODIFICATION TO THE PRODUCTION DATABASE IS ALLOWED                │ │
│   └───────────────────────────────────────────────────────────────────┘ │
│                                    ▼                                     │
│   ┌───────────────────────────────────────────────────────────────────┐ │
│   │ 219 RE-START A PROCESS OF SYNCHRONIZING THE STAGING DATABASE      │ │
│   │ WITH THE PRODUCTION DATABASE                                       │ │
│   └───────────────────────────────────────────────────────────────────┘ │
│                                                                          │
│                                   OR                                     │
│                                                                          │
│   ┌───────────────────────────────────────────────────────────────────┐ │
│   │ 220 RECEIVE, AT THE STAGING DATABASE, A FIRST DATASET FROM THE    │ │
│   │ PRODUCTION DATABASE, THE FIRST DATASET COMPRISING DATA NOT         │ │
│   │ PREVIOUSLY CONTAINED WITHIN THE STAGING DATABASE                   │ │
│   └───────────────────────────────────────────────────────────────────┘ │
│                                    ▼                                     │
│   ┌───────────────────────────────────────────────────────────────────┐ │
│   │ 221 SET A FLAG IN THE STAGING DATABASE INDICATING THE FIRST       │ │
│   │ DATASET TRANSMITTED TO THE STAGING DATABASE ORIGINATED FROM       │ │
│   │ THE PRODUCTION DATABASE SUCH THAT A PROCESS OF SYNCHRONIZING      │ │
│   │ THE STAGING DATABASE WITH THE PRODUCTION DATABASE WILL NOT        │ │
│   │ COPY THE FIRST DATASET TRANSMITTED TO THE STAGING DATABASE        │ │
│   │ BACK TO THE PRODUCTION DATABASE FROM WHICH THE FIRST DATASET      │ │
│   │ ORIGINATED                                                         │ │
│   └───────────────────────────────────────────────────────────────────┘ │
└─────────────────────────────────────────────────────────────────────────┘
```

*FIG. 5*

```
┌──────────────────────────────────────────────────────────────────────────────┐
│ 222 RE-ENGAGE THE CONNECTION BETWEEN THE STAGING DATABASE AND THE            │
│ PRODUCTION DATABASE                                                          │
│  ┌────────────────────────────────────────────────────────────────────────┐  │
│  │ 223 TRANSMIT, FROM THE STAGING DATABASE TO THE PRODUCTION              │  │
│  │ DATABASE, THE DATASET STORED IN THE STAGING DATABASE                   │  │
│  │  ┌──────────────────────────────────────────────────────────────────┐  │  │
│  │  │  ┌────────────────────────────────────────────────────────────┐  │  │  │
│  │  │  │ 224 COLLECT A CHANGE DATASET INDICATING A PLURALITY OF     │  │  │  │
│  │  │  │ TABLES IN THE STAGING DATABASE THAT WERE MODIFIED AS A     │  │  │  │
│  │  │  │ RESULT OF RECEIPT OF THE DATASET AT THE STAGING            │  │  │  │
│  │  │  │ DATABASE                                                   │  │  │  │
│  │  │  └────────────────────────────────────────────────────────────┘  │  │  │
│  │  │                              │                                   │  │  │
│  │  │                              ▼                                   │  │  │
│  │  │  ┌────────────────────────────────────────────────────────────┐  │  │  │
│  │  │  │ 225 TRANSMIT, FROM THE STAGING DATABASE TO THE             │  │  │  │
│  │  │  │ PRODUCTION DATABASE, DATA CONTAINED WITHIN THE             │  │  │  │
│  │  │  │ PLURALITY OF TABLES INDICATED BY THE CHANGE DATASET        │  │  │  │
│  │  │  └────────────────────────────────────────────────────────────┘  │  │  │
│  │  └──────────────────────────────────────────────────────────────────┘  │  │
│  │                                                                        │  │
│  │                                   OR                                   │  │
│  │                                                                        │  │
│  │  ┌──────────────────────────────────────────────────────────────────┐  │  │
│  │  │ 226 SET A FLAG IN THE PRODUCTION DATABASE INDICATING THE         │  │  │
│  │  │ DATASET TRANSMITTED TO THE PRODUCTION DATABASE                   │  │  │
│  │  │ ORIGINATED FROM THE STAGING DATABASE SUCH THAT A                 │  │  │
│  │  │ PROCESS OF SYNCHRONIZING THE STAGING DATABASE WITH THE           │  │  │
│  │  │ PRODUCTION DATABASE WILL NOT COPY THE DATASET                    │  │  │
│  │  │ TRANSMITTED TO THE PRODUCTION DATABASE BACK TO THE               │  │  │
│  │  │ STAGING DATABASE FROM WHICH THE DATASET ORIGINATED               │  │  │
│  │  └──────────────────────────────────────────────────────────────────┘  │  │
│  └────────────────────────────────────────────────────────────────────────┘  │
└──────────────────────────────────────────────────────────────────────────────┘
```

FIG. 6

227 TRANSMIT, FROM THE STAGING DATABASE TO THE PRODUCTION DATABASE, THE DATASET STORED IN THE STAGING DATABASE

228 RECEIVE NOTIFICATION THAT AN ERROR HAS OCCURRED DURING TRANSMISSION OF THE DATASET FROM THE STAGING DATABASE TO THE PRODUCTION DATABASE

229 REVERSE ANY CHANGES MADE TO THE PRODUCTION DATABASE AS A RESULT OF THE TRANSMISSION OF THE DATASET FROM THE STAGING DATABASE TO THE PRODUCTION DATABASE

230 RECORD THE ERROR

231 ATTEMPT TO RE-TRANSMIT FROM THE STAGING DATABASE TO THE PRODUCTION DATABASE, THE DATASET STORED IN THE STAGING DATABASE

*FIG. 7*

METHODS AND APPARATUS FOR COLLECTING DATABASE TRANSACTIONS

RELATION TO OTHER APPLICATIONS

This application relates to the following applications filed on the same date as the present application:

i) "METHODS AND APPARATUS FOR SYNCHRONIZING NETWORK MANAGEMENT DATA", Filed Jun. 28, 2006, U.S. application Ser. No. 11/477,026.

ii) "METHODS AND APPARATUS FOR DETECTION AND RECOVERY OF DATABASE OUT OF SYNCHRONIZATION CONDITIONS", Filed Jun. 28, 2006, U.S. application Ser. No. 11/476,380.

The teachings and disclosure of the above co-filed applications are each incorporated by reference herein in their entirety.

BACKGROUND

The rapid expansion of information service and data processing industries has resulted in a need for computer systems to manage and store large amounts of data. As an example, financial service industry businesses such as banks, mutual fund companies or the like often operate large and complex data processing systems that require access to many hundreds of gigabytes or even terabytes of data. Data storage system developers have responded to these types of data storage requirements by integrating large capacity data storage systems, data communications devices and computer systems into networks called "storage networks" or "storage area networks" (SANs.) A storage area network is a collection of data storage systems that are networked with a number of host computer systems that operate as servers to access data stored in the data storage systems.

Elements of a typical conventional storage area network implementation include one or more connectivity devices such as high speed data switches or routers that interconnect the various data storage systems to each other and to one or more host or server computer systems (servers) that require access to (e.g., read and/or write) the data in the data storage systems on behalf of client software applications and/or client computer systems.

A developer or administrator of such a storage area network environment may install one or more distributed storage area network management software applications within the storage area network to manage or administer the various elements (i.e., devices, computer systems, storage systems, etc.) that operate within the storage area network. A SAN Administrator (i.e., a user) responsible for management of the storage area network operates the network management software application to perform management tasks such as performance monitoring, network analysis and remote configuration and administration of the various components operating within the storage area network.

A typical conventional storage area network management software application may have several different software components that execute independently of each other on different computer systems but that collectively interoperate together to perform network management. As an example, conventional designs of storage area network management applications can include console, server, agent and storage software components.

Generally, the server component operates as a central control process within the storage area network management application and coordinates communication between the console, storage and agent components. The console component often executes within a dedicated storage area network management workstation to allow the network administrator to visualize and remotely control and manage the various elements within the storage area network that are graphically represented within the console. Certain console applications include Graphical User Interface (GUI) software programs that enable SAN Administrators to graphically manage, control and configure various types of hardware and software resources or managed entities associated with a corresponding managed network. In one conventional storage area network management application, rendering the graphical user interface enables the SAN Administrator to graphically select, interact with, and manage local or remote devices and associated software processes operating in the network. More specifically, based on use of the graphical user interface in combination with an input device such as a hand operated keyboard and/or mouse and corresponding pointer displayed on a viewing screen, a SAN Administrator is able to manage hardware and software entities such as storage devices, peripherals, network data communications devices, and so forth associated with the network. Typically, in such network management applications, a SAN Administrator may select a displayed icon representing a corresponding resource (i.e., a managed resource) in the storage area network and apply a management command in order to display corresponding management information.

Enterprise Storage Networks or Storage Area Networks (SANs) are large and complex environments that include various elements such as storage arrays, switches, hosts and databases all inter-networked. These elements may exist in number by the hundreds in large installations of such environments. These elements in turn may consist of several hundred or thousands of manageable elements or managed resources such as storage devices, storage and switch ports, database instances, host devices and file systems, and the like. Management of such environments is a daunting task and typically requires Storage Resource Management solutions such as EMC's Control Center (ECC) family of products, available from EMC Corporation of Hopkinton, Mass. ECC includes agents that are deployed on host computer systems in a SAN for the purpose of gathering data about the various managed resources in the SAN. The agents periodically collect network management data on components such as hosts, switches and storage systems that process and persist data, as well as on applications that use persisted information to enable the management of these environments. In other words, agents collect data associated with the managed resources, and that data is inserted into databases for use within Storage Resource Management solutions, such as ECC. ECC identifies the entire process of retrieving the collected data from agents to data persistence as a transaction. Agents collect data periodically, such as nightly, on the resources and engage in a transaction to send the collected data to the ECC repository for access by ECC applications such as console and server processes that allow SAN administrators to manage the SAN.

SUMMARY

Conventional technologies for Storage Resource Management solutions suffer from a variety of deficiencies. In particular, conventional technologies for Storage Resource Management solutions are limited in that the conventional agents that collect data from various managed resources in the SAN, such as from large storage arrays, must transmit these large datasets of management data to store process for placement into a database. However, this process is cumbersome due to the large size of the collected datasets. Databases or schemas, such as a production databases, are used in conjunction with consoles for displaying data collected from managed resources and are required to be maintained in a complete and accessible state for as often as possible. Such production databases that store management data for access by the SAN management application must not be disrupted for long periods of time during which the datasets collected from agents are inserted into the database. Moreover, the production databases in conventional configurations of SAN management applications must be "brought down" into an in accessible state while the large datasets, collected by agents, is processed for insertion into the production database. Such production databases cannot be accessed until the insertion of agent collected data is finished. If data were allowed to be accessed during an incomplete insertion (of these extra large datasets in the production database), such processing would result in partial or inaccurate data displayed at the management console for viewing by the administrator.

As managed object data is inserted into the production database, that data is displayed on the console for the SAN Administrator to view. In some instances, the sets of managed object data are very large, and are partitioned into manageable partitions prior to being transmitted to the production database. In conventional systems, the production database receives each partition serially, and the data in each partition is inserted into the production database one by one. Problems occur when one or more partitions are not successfully inserted into the production database, resulting in the transaction being aborted. However, during the time in which the transaction was being processed, the production database was offline for access by consoles or other SAN management processes to avoid those processes from viewing an inconsistent set of management data. Upon abortion of a transaction, the production database can be reverted to its original form, but conventional systems still must remain offline during the transaction processing and abort processing.

Embodiments disclosed herein significantly overcome deficiencies of conventional technologies and provide a system that includes a computer system executing a database transaction collecting process. The systems disclosed herein makes a SAN management application much more efficient since agents that collect large amounts of data to be accessed by various processes in the SAN management application passes such large datasets to a store process that first places such data into a staging database that is separate from the actual production database used by the SAN management processes such as consoles, servers and the like. By using a staging database to initially receive transaction data, rather than placing transaction data directly into the production database, data associated with the transaction that is stored within the production database can remain accessible in a read-only state during transaction processing while corresponding data in the staging database is modified with the transaction data arriving from the agent to the store process. Once an agent has successfully transmitted all partitions of data in a given transaction to a store process and the store process has committed these partitions to the staging database, the staging and production databases can then be synchronized to allow the production data to reflect all changes associated with the transaction. Thereafter, the production database can be returned to its normal read-write state. The system thus allows the production database to available, at least for read access, during transactions, and further prevents a view of the production database that is inconsistent (e.g. avoids presenting a view of the data during partial completion of a transaction).

The database transaction collecting process as disclosed herein operates on a staging database that is in communication with a production database, and receives a dataset from an agent software process. In one embodiment, the dataset is an extra large dataset, and has been divided into partitions prior to being received at the staging database. Prior to a transaction occurring, tables in a staging database are kept in synchronicity with corresponding tables in a production database such that changes to production data (e.g. a console setting a parameter of a device in a storage array) are immediately reflected in the corresponding table in the staging database. Thus during periods where no transaction is taking place, the staging and production databases contain a set of corresponding tables (for those tables that are subject to staging as described herein). However, periodically, an agent collects data from a managed resource, such as a large storage array, that results in production, by the agent, of a large dataset that must be sent to a store process for placement into the production database. As an example, an agent might collect data nightly from a large storage array resulting in many megabytes of data to be placed into the production database for access by the management software.

During processing described herein, the agent software process divides the extra large dataset into a plurality of partitions and transmits the plurality of partitions to a store system or process in the order in which the partitions are to be inserted into the staging database. The store system, using the techniques explained herein, then transmits the plurality of partitions to the staging database rather than directly to the production database. In particular, upon receiving the first partition of the extra large dataset from the agent, the database transaction collecting process (i.e. operating as part of a store process) disengages the staging database from synchronicity with the production database via a call to a lock manager. This prevents representative data from being written to the production database until the dataset (i.e., the plurality of partitions in the dataset) has been received at, and stored in the staging database and copied to the production database. During a transaction then, data (i.e. tables) in the production database that corresponds to data in the staging database that are to be modified during the transaction are maintained in read-only mode to allow the console and other SAN management processes to be able to continue to access the production database. During the transaction, each partition is received serially from the agent. Upon successful receipt of the partition, the data contained within the partition is committed to the staging database that is now not being maintained in synchronicity with the production database. Once the entire dataset has been stored in the staging database, the staging database synchronizes the data with the production database. Datasets that are atomic transactions and have not been partitioned, simply pass through the staging database into the production database.

Embodiments disclosed include a computer system executing a database transaction collecting process. The database transaction collecting process receives a dataset for storing in a staging database. The dataset contains network management data collected from a managed resource. The database transaction collecting process disengages a connection between the staging database and a production database, and stores the dataset in the staging database, for example locking the production database such that no data can be inserted into the production database during the storing of the dataset into the staging database. The database transaction collecting process then re-engages the connection between the staging database and the production database, for example, releasing the lock on the production database.

During an example operation of one embodiment, suppose a system executing the database transaction collecting process on a staging database, receives an extra large dataset from a Symmetrix storage system. The extra large dataset has been partitioned into a set of partitions by an agent software process. The partitions are then processed by a store system for transmission to the staging database. The database transaction collecting process, operating on the staging database, receives the first partition from the store system, and calls a lock manager function to acquire locks for all top level managed objects. This ensures that no data is written to the production database during the processing of all the partitions at the staging database. Thus, all the data in the partitions is stored in the staging database before the staging database and production database are synchronized together. The database transaction collecting process on the staging database receives each partition in the set of partitions. When the last partition has been successfully received, a commit transaction process is invoked, to commit the data to the staging database. The staging database is synchronized with the production database, and then the locks are released on the representative data set. The data in the extra large dataset from the Symmetrix storage system can now be viewed on the ECC console in its entirety.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments disclosed herein.

It is to be understood that the system disclosed herein may be embodied strictly as a software program, as software and hardware, or as hardware alone. The features disclosed herein may be employed in data communications devices and other computerized devices and software systems for such devices such as those manufactured by EMC, Inc., of Hopkinton, Mass.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 3 illustrates a flowchart of a procedure performed by the system of FIG. 1 when the database transaction collecting process receives a dataset for storing in a staging database, and receives notification that a plurality of partitions is to be transmitted to the staging database, according to one embodiment disclosed herein.

FIG. 5 illustrates a flowchart of a procedure performed by the system of FIG. 1 when the database transaction collecting process re-engages the connection between the staging database and the production database, according to one embodiment disclosed herein.

FIG. 6 illustrates a flowchart of a procedure performed by the system of FIG. 1 when the database transaction collecting process re-engages the connection between the staging database and the production database, and transmits, from the staging database to the production database, the dataset stored in the staging database, according to one embodiment disclosed herein.

FIG. 7 illustrates a flowchart of a procedure performed by the system of FIG. 1 when the database transaction collecting process transmits, from the staging database to the production database, the dataset stored in the staging database, and receives notification that an error has occurred during transmission of the dataset from the staging database to the production database, according to one embodiment disclosed herein.

DETAILED DESCRIPTION

Embodiments disclosed herein include methods and a computer system that perform a database transaction collecting process. The database transaction collecting process operates in a store process that accesses a staging database that is in communication with the production database and that receives a dataset from an agent software process. In one embodiment, the dataset is an extra large dataset, and has been divided into partitions prior to being received at the staging database. An agent software process divides the extra large dataset into a plurality of partitions and transmits the plurality of partitions to a store system in the order in which the partitions are to be inserted into the staging database. The store system then transmits the plurality of partitions to the staging database. Upon receiving the first partition of the extra large dataset, the database transaction collecting process disengages from the production database via a call to a lock manager. By disengages, what is meant in one configuration is that synchronization that is normally in operation during periods where no transactions are taking place is temporarily stopped and the production database (i.e., tables associated with the transaction data) is placed in read only mode. This prevents any data from being written to the production database until the dataset (i.e., the plurality of partitions in the dataset) has been received at, and stored in the staging database. Each partition is received serially. If any errors occur during receiving of the partitions, the staging database is rolled back to the point prior to receipt of the partition. Upon successful receipt of the partition, the data contained within the partition is committed to the staging database. Once the dataset has been stored in the staging database, the staging database synchronizes the data with the production database. Datasets that are atomic transactions and have not been partitions, simply pass through the staging database into the production database. Embodiments disclosed include a computer system executing a database transaction collecting process. The database transaction collecting process receives a dataset for storing in a staging database. The dataset contains network management data collected from a managed resource. The database transaction collecting process disengages a connection between the staging database and a production database, and stores the dataset in the staging database. The database transaction collecting process then re-engages the connection between the staging database and the production database.

Figure 1:
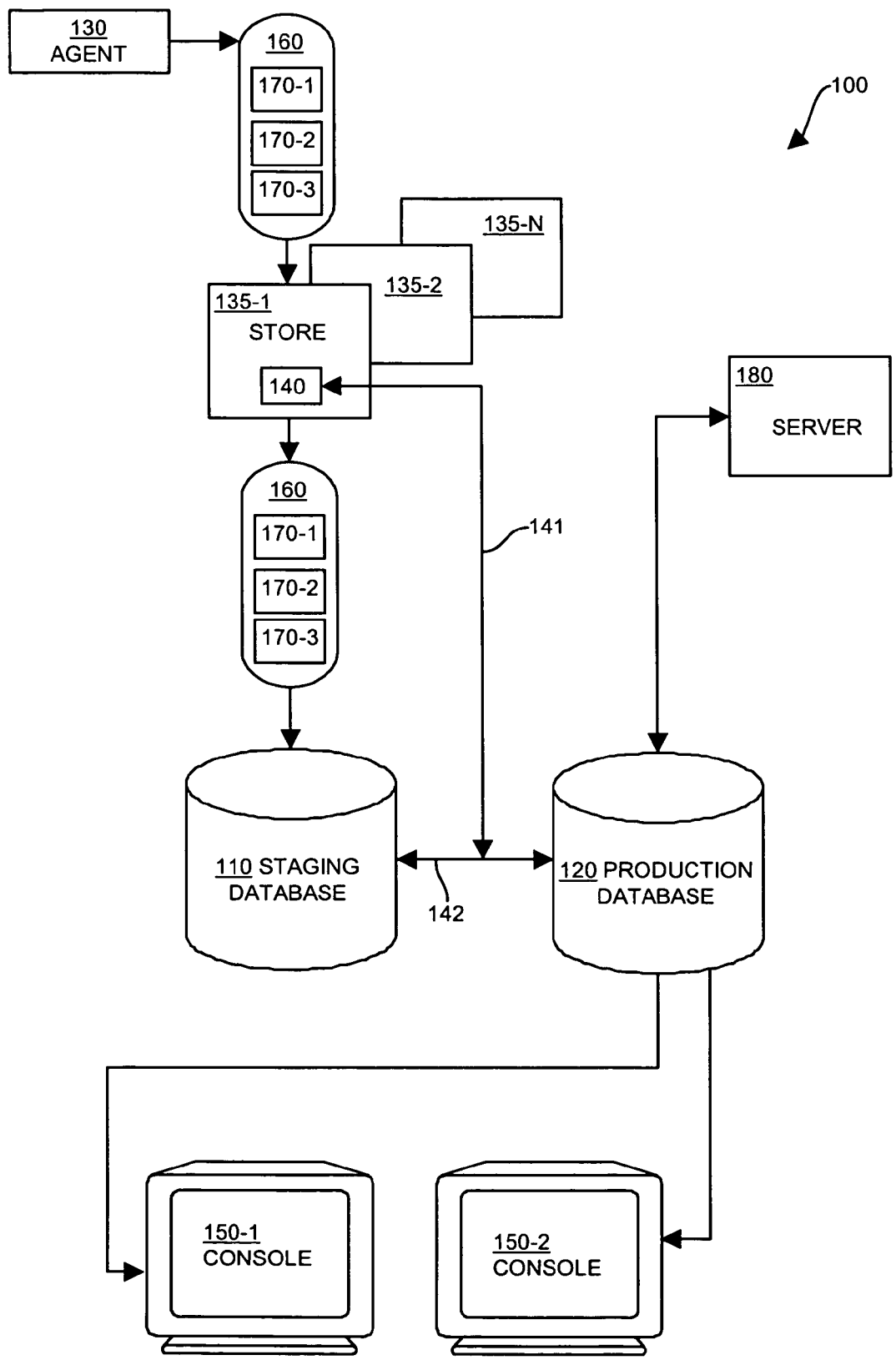
FIG. 1 shows a high-level block diagram of a computer system according to one embodiment disclosed herein.

FIG. 1 is a block diagram illustrating example architecture of a computer-networking environment 100 that includes an agent 130, a plurality of store systems 135-N, a computer system including a staging database 110, and a computer system that includes a production database 120. The staging database 110 is in communication with the production database 120 and synchronization between then can be engaged or disengaged as described herein. The production database 120 is in communication with at least one server 160 and at least one console 150-1. The store processes or systems 135 receive extra large datasets 160 of managed object data from the agent 130 as a series of partitions 170. In turn, the store process 135 transfers the data for the extra large dataset 160 from each of the plurality of partitions 170-N into the staging database 110. The staging database 110 receives the data from the plurality of partitions 170-N. The database transaction collecting process 140, operating either in the store processes 135, or on the computer system on which the staging database 110 resides, stores the data (contained in the plurality of partitions 170-N) into the staging database 110. The database transaction collecting process 140 then synchronizes the data (contained within the staging database 110) with the production database 120 for display on the consoles 150-N (or for access by other processes within the network management application).

The database transaction collecting process 140 may be embodied as software code such as data and/or logic instructions (e.g., code stored in the memory or on another computer readable medium such as a removable disk) that supports processing functionality according to different embodiments described herein.

It is noted that example configurations disclosed herein include the database transaction collecting process 140 itself (i.e., in the form of un-executed or non-performing logic instructions and/or data). The database transaction collecting process 140 may be stored as an application on a computer readable medium (such as a floppy disk), hard disk, electronic, magnetic, optical, or other computer readable medium. The database transaction collecting process 140 may also be stored in a memory system such as in firmware, read only memory (ROM), or, as in this example, as executable code in, for example, Random Access Memory (RAM). Those skilled in the art will understand that the agent 130, stores 135-N, server 180, production database 120, staging database 110, and consoles 150-N may include other processes and/or software and hardware components, such as an operating system not shown in this example.

Further details of configurations explained herein will now be provided with respect to a flow chart of processing steps that show the high level operations disclosed herein to perform the database transaction collecting process 140.

Figure 2:
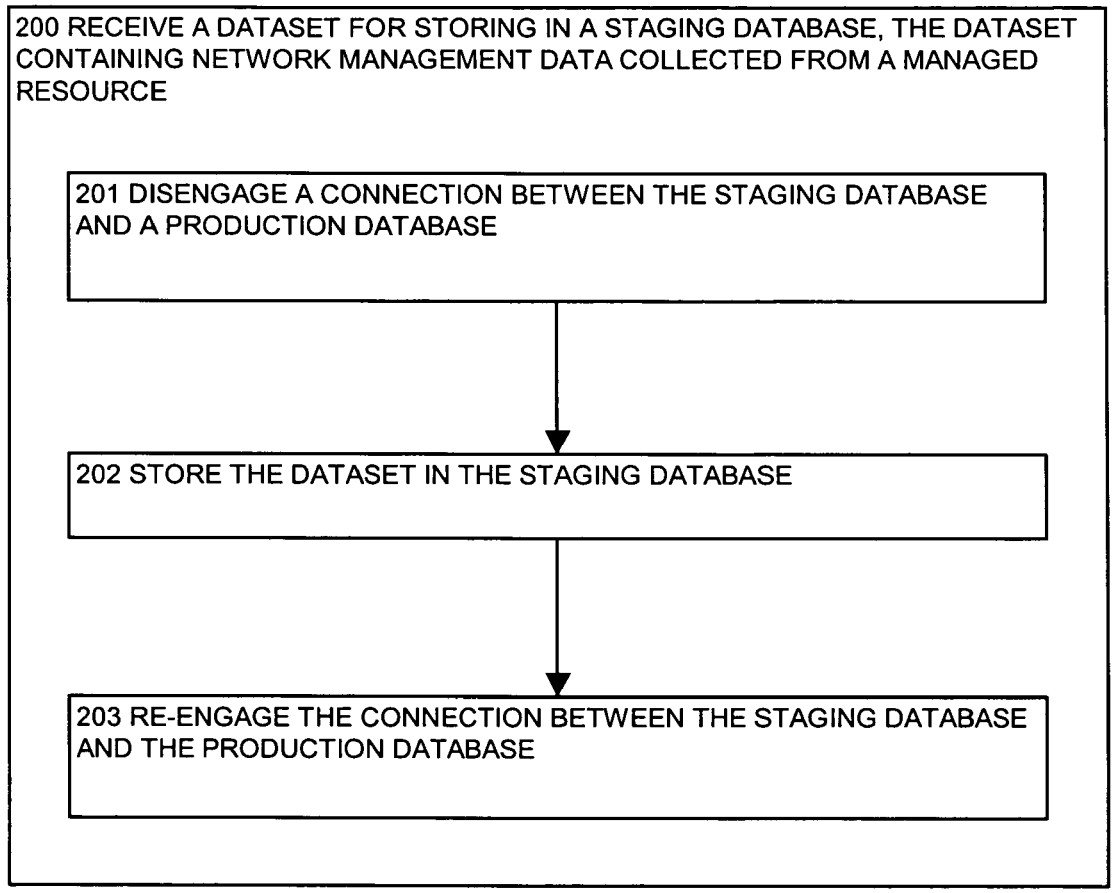
FIG. 2 illustrates a flowchart of a procedure performed by the system of FIG. 1 when the database transaction collecting process receives a dataset for storing in a staging database, according to one embodiment disclosed herein.

FIG. 2 is a flowchart of the steps performed by the database transaction collecting process 140 when it receives a dataset 160 for storing in a staging database 110.

In step 200, the database transaction collecting process 140 receives a dataset 160 for storing in a staging database 110. The dataset 160 contains network management data collected by an agent 130 from a managed resource. For example, the dataset 160 may be data collected from a large SAN resource such as a storage array that has many thousands of devices configured as logical entities to store data in the SAN. The dataset 160 is transmitted by the agent 130, and processed by a process on a store system 135-N. In an example embodiment, multiple agents 130-N are transmitting datasets 160-N to the database transaction collecting process 140 residing on the staging database 110.

In step 201, the database transaction collecting process 140 disengages 141 a connection 142 that maintains synchronicity between the staging database 110 and a production database 120. During periods of no transaction processing as explained herein, the staging database 110 is normally in communication and is maintained in synchronicity with the production database 120. Upon receiving a dataset 160 for storing in the staging database 110, the database transaction collecting process 140 disengages 141 that connection 142 between the staging database 110 and the production database 120, such that the staging database 110 can receive the dataset 160 in its entirety prior to re-synchronizing the production database 120 with the staging database 110. This also locks the production database in a read-only mode to prevent new data from being inserted (e.g. by a console) into the production database 120 while the dataset is being stored in the staging database 110 from the store process. Otherwise, during a process of synchronizing the staging database 110 with the production database 120, the new data inserted into the production database 120 would be overwritten by the dataset inserted into the staging database 110.

In step 202, the database transaction collecting process 140 stores the dataset 160 in the staging database 110. Upon successful receipt of the dataset 160 transmitted from the agent 130, the dataset 160 is stored in the staging database 110.

In step 203, the database transaction collecting process 140 re-engages the connection between the staging database 110, and the production database 120 after receipt of the dataset 160. The production database 120 is then synchronized with the staging database 110 such that the production database 120 is updated with the dataset 160 previously inserted into the staging database 110. This update (of the production database 120) can include inserting, deleting and/or updating data in the production database 120.

FIG. 3 is a flowchart of the steps performed by the database transaction collecting process 140 when it receives a dataset 160 for storing in a staging database 110 and explains more detail of the processing system described herein.

In step 204, the database transaction collecting process 140 receives a dataset 160 for storing in a staging database 110. The dataset 160 contains network management data collected from a managed resource. In an example embodiment, the dataset 160 is received by the staging database 110 as an atomic transaction, and passes through the staging database 110 to the production database 120.

In step 205, the database transaction collecting process 140 receives notification that a plurality of partitions 170-N is to be transmitted to the staging database. In an example embodiment, the dataset 160 is an extra large dataset 160, for example, collected by an agent 130 from a large storage system, such as a Symmetrix data storage system made by EMC Corporation. The agent 130 divides the extra large dataset 160 into a plurality of partitions 170-N for transmitting to the staging database 110. The store system 135-1 processes each partition 170-1 in the order in which that partition 170-1 is received from the agent 130, and transmits each partition 170-1 to the database transaction collecting process 140 residing on the staging database 110. Each partition 170-1 within the plurality of partitions 170-N is treated as a separate database transaction during the storing of the plurality of partitions 170-N (i.e., the dataset 160) in the staging database 110.

In step 206, the database transaction collecting process 140 identifies a plurality of first tables within the production database 120 that correspond to the dataset 160. In one embodiment, the database transaction collecting process 140 identifies the first tables based on the data that is contained within the dataset 160. That is, the database transaction collecting process 140 examines the data contained within the dataset 160, and identifies those tables within the production database 120 that will be affected by the insertion of the dataset 160 into the production database 120. Those tables in which data will be inserted, deleted, and/or updated are considered to be affected by the insertion of the dataset 160 into the production database 120. In another embodiment, the set of first tables within the production database 120 that correspond to the dataset 160, is previously identified based on which managed objects on the system transmit extra large datasets 160. For example, those tables that process data related to Symmetrix systems, such as a Symmetrix table and the Symdevice table used to keep data on logical devices configured in the Symmetrix storage array, are likely to produce extra large datasets 160 that require partitioning.

In step 207, the database transaction collecting process 140 creates a plurality of second tables in the staging database 110 that mirror the plurality of first tables within the production database 120. For each table within the plurality of first tables in the production database 120 identified to correspond with the data in the dataset 160, a mirror set of tables is created in the staging database 110. During the process of storing the dataset 160 in the staging database 110, the data within the dataset 160 is stored in these created tables in the staging database 110.

Alternatively, in step 208, the database transaction collecting process 140 identifies a plurality of first tables within the production database 120 that do not correspond to the dataset 160. Those tables in the production database 120, that do not receive data from the extra large datasets 160, are identified. For example, those tables that do not correspond to the data within the dataset 160 include those tables in the production database 120 that will not have data inserted, deleted and/or updated during the insertion of the dataset 160 into the production database 120.

In step 209, the database transaction collecting process 140 creates a plurality of alias tables in the staging database 110. The plurality of alias tables corresponds to the plurality of first tables in the production database 120. In one embodiment, there are tables existing within the production database 120 that will not receive data from the dataset 160. Aliases or synonyms for these tables are created within the staging database 110. Data from the dataset 160 will not be written to these alias tables. However, during the process of synchronizing the staging database 110 with the production database 120, these alias tables may receive data from the production database 120.

Figure 4:
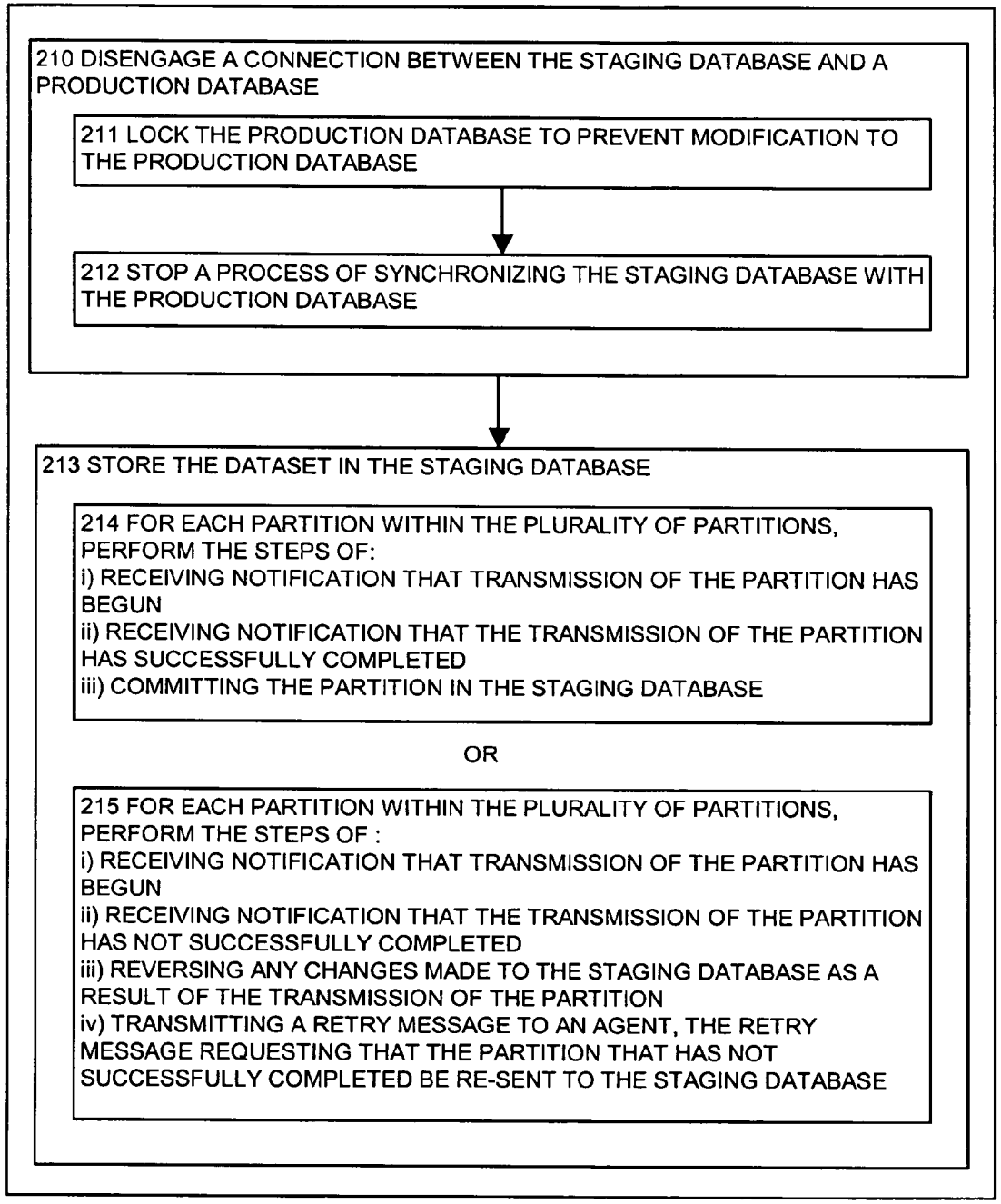
FIG. 4 illustrates a flowchart of a procedure performed by the system of FIG. 1 when the database transaction collecting process disengages a connection between the staging database and a production database, according to one embodiment disclosed herein.

FIG. 4 is a flowchart of the steps performed by the database transaction collecting process 140 when it disengages a connection between the staging database 110 and a production database 120.

In step 210, the database transaction collecting process 140 disengages a connection between the staging database 110 and a production database 120. In one embodiment, the database transaction collecting process 140 calls a lock manager function to acquire locks for all top level managed objects for which the agent 130 collects data in the form of the dataset 160.

In step 211, the database transaction collecting process 140 locks the production database 120 to prevent modification to the production database 120. During the process of receiving the plurality of partitions 170-N that comprise the dataset 160, the database transaction collecting process 140 locks the production database 120 such that no new data is inserted into the production database 120, for example, from the server 180. Otherwise, when the staging database 110 synchronizes the data from the dataset 160 with the production database 120, the new data (received from the server 180) inserted into the production database 120, may be overwritten by the data in the dataset 160 (previously inserted into the staging database 110, and then synchronized with the production database 120).

In step 212, the database transaction collecting process 140 stops a process of synchronizing the staging database 110 with the production database 120. As the staging database 110 receives new data from the agent 130, the staging database 110 synchronizes with the production database 120. As the production database 120 receives new data from, for example, the server 180, the production database 120 synchronizes with the staging database 110. During the process of storing the data from the dataset 160 in the staging database 110, the production database 120 is locked (from receiving new data), and this process of synchronization between the staging database 110 and the production database 120 is halted.

In step 213, the database transaction collecting process 140 stores the dataset 160 in the staging database 110. The dataset 160 is received at the agent 130, from managed objects. The agent 130 divides the extra large datasets 160 into partitions 170-N and transmits the partitions to the store system 135-1. The partitions 170-N are received and processed at the stores system 135-1 in the order in which the agent 130 transmits the partitions 170-N. The partitions 170-N are then stored in the staging database 110.

In step 214, for each partition 170-1 within the plurality of partitions 170-N, the database transaction collecting process 140 performs the steps of:

i) Receiving notification that transmission of the partition 170-1 has begun, for example, a begin partition function is invoked indicating the starting point of a partition 170-1.

ii) Receiving notification that the transmission of the partition 170-1 has successfully completed, for example a function is invoked indicating the ending point of a partition 170-1.

iii) Committing the partition 170-1 in the staging database 110, for example, via a commit partition function. For example, a commit partition function is invoked to commit the partition 170-1 to the staging database 110.

Alternatively, in step 215, for each partition 170-1 within the plurality of partitions 170-N, the database transaction collecting process 140 performs the steps of:

i) Receiving notification that transmission of the partition 170-1 has begun, for example, a begin partition function is invoked indicating the starting point of a partition 170-1.

ii) Receiving notification that the transmission of the partition 170-1 has not successfully completed, for example, an error may occur during the transmission of the partition 170-1. This may result in the staging database 110 failing to receive the complete partition 170-1.

iii) Reversing any changes made to the staging database 110 as a result of the transmission of the partition 170-1. For example, some of the data of the partition 170-1 may have been inserted into the staging database 110 during the transmission of the partition 170-1. Upon notification that the partition 170-1 was not successfully (and completely) received at the staging database 110, the database transaction collecting process 140 rolls back the data (in the staging database 110) that correspond to the uncompleted partition 170-1. Thus, the staging database 110 is rolled back to a previous point prior to the transmission of the partition 170-1 to the staging database 110.

iv) Transmitting a retry message to the agent 130. The retry message requests that the partition 170-1 (that has not successfully completed transmission to the staging database 110) be re-sent to the staging database 110.

FIG. 5 is a flowchart of the steps performed by the database transaction collecting process 140 when it re-engages the connection between the staging database 110 and the production database 120.

In step 216, the database transaction collecting process 140 re-engages the connection between the staging database 110, and the production database 120 after receipt of the dataset 160. The production database 120 is then synchronized with the staging database 110 such that the production database 120 is updated with the dataset 160 previously inserted into the staging database 110. This update (of the production database 120) can include inserting, deleting and/or updating data in the production database 120.

In step 217, the database transaction collecting process 140 detects when all partitions 170-N within the plurality of partitions 170-N have been successfully committed to the staging database 110. Upon successful receipt of the last partition 170-N at the staging database 110, a commit transaction function is invoked to commit all the partitions to the staging database 110. Thus, all the data in the plurality of partitions 170-N is committed (i.e., stored) into the staging database 110.

In step 218, the database transaction collecting process 140 releases a lock on the production database 120 such that modification to the production database 120 is allowed. Upon receipt of the first partition 170-1 at the staging database 110, a lock manager function was called to prevent any modification to the production database 120 during the committing of the partitions 170-N to the staging database 110. Upon notification that this commit was successful, the database transaction collecting process 140 releases a lock on the production database 120.

In step 219, the database transaction collecting process 140 re-starts a process of synchronizing the staging database 110 with the production database 120. The database transaction collecting process 140 begins the process of synchronizing the data in the staging database 110 with the data in the production database 120, such that the production database 120 receives the data previously contained in the dataset 160 received at the staging database 110. Upon completion of the synchronization, the data in the dataset 160 will be available for display on the consoles 150-N. A SAN Administrator will be able to view and perform actions on the managed objects represented by icons on the consoles 150-N.

Alternatively, in step 220, the database transaction collecting process 140 receives, at the staging database 110, a first dataset from the production database 120. The first dataset is comprised of data not previously contained within the staging database 120. This first dataset, residing in the production database 120, may have originated from, for example, a server 180. The process of synchronization between the staging database 110 and the production database 120 is a mutual transaction. The staging database 110 both transmits and receives data from the production database 120, and the production database 120 both transmits and receives data from the staging database 110. Thus, the staging database 110 receives data from the production database 120 such that, when the staging database 110 receives a new dataset 160 from the agent 130, the data contained within the staging database 110 is up to date, and synchronized with the production database 120.

In step 221, the database transaction collecting process 140 sets a flag in the staging database 110. The flag indicates that the first dataset transmitted to the staging database 110 originated from the production database 120. This is to ensure that a process of synchronizing the staging database 110 with the production database 120 will not copy the first dataset transmitted to the staging database 110 (from the production database 120) back to the production database 120 from which the first dataset originated. The flag prevents an endless loop of transferring data from the production database 120 to the staging database 110 and back.

FIG. 6 is a flowchart of the steps performed by the database transaction collecting process 140 when it re-engages the connection between the staging database 110 and the production database 120.

In step 222, the database transaction collecting process 140 re-engages the connection between the staging database 110 and the production database 120 after successful receipt of all the partitions 170-N within the dataset 160. In an example embodiment, a lock is placed on the production database 120 to prevent any data from being written to the production database 120 during the storing of the dataset 160 in the staging database 110. Upon successful completion of this store, the lock is released, the communication between the staging database 110 and the production database 120 is re-engaged.

In step 223, the database transaction collecting process 140 transmits, from the staging database 110 to the production database 120, the dataset 160 stored in the staging database 110. The staging database 110 receives a dataset 160, in the form of a plurality of partitions 170-N, from the agent 130. The dataset 160 is stored in the staging database 110. Upon successful completion of the storing process, a process of synchronization begins to transmit the data from the staging database 110 to the production database 120.

In step 224, the database transaction collecting process 140 collects a change dataset indicating a plurality of tables in the staging database 110 that were modified as a result of receipt of the dataset at the staging database 110. The change dataset records which tables in the staging database 110 were modified as a result of receiving the dataset 160. During the process of synchronizing the production database 120 with the staging database 10, the change dataset is used to verify that the data in the dataset 160 was successfully copied over to the production database 120.

In step 225, the database transaction collecting process 140 transmits, from the staging database 110 to the production database 120, data contained within the plurality of tables indicated by the change dataset. The synchronization process updates the production database 120 with the dataset 160 stored in the staging database 110 such that the production database 120 mirrors the staging database 110. The updating of the production database 120 can include inserting, deleting and/or updating records and tables within the production database 120.

In step 226, the database transaction collecting process 140 sets a flag in the production database 120. The flag indicates that the dataset 160 transmitted to the production database 120 originated from the staging database 110. This is to ensure that the process of synchronizing the staging database 110 with the production database 120 will not copy the dataset 160 transmitted (from the staging database 110) to the production database 120 back to the staging database 110 from which the dataset 160 originated. Otherwise, an endless loop will occur of copying the dataset 160 from the staging database 110 to the production database 120 and back.

FIG. 7 is a flowchart of the steps performed by the database transaction collecting process 140 when it transmits, from the staging database 110 to the production database 120, the dataset 160 stored in the staging database 110.

In step 227, the database transaction collecting process 140 transmits, from the staging database 110 to the production database 120, the dataset 160 stored in the staging database 110. This process of synchronization ensures the production database 120 mirrors the staging database 110.

In step 228, the database transaction collecting process 140 receives notification that an error has occurred during transmission of the dataset 160 from the staging database 110 to the production database 120. Errors during the synchronization process can include failure to receive the complete dataset 160 at the production database 120.

In step 229, the database transaction collecting process 140 reverses any changes made to the production database 120 as a result of the transmission of the dataset 160 from the staging database 110 to the production database 120. The database transaction collecting process 140 rolls back any changes made to the production database 120 during the failed synchronization of the production database 120 with the staging database 110. Thus the data in the production database 120 is rolled back to a point prior to the attempt to synchronize the production database 120 with the staging database 110.

In step 230, the database transaction collecting process 140 records the error that occurred during the synchronization process between the staging database 110 and the production database 120.

In step 231, the database transaction collecting process 140 attempts to re-transmit from the staging database 110 to the production database 120, the dataset 160 stored in the staging database 110. The database transaction collecting process 140 retries the synchronization process in an effort to insert the data from the dataset 160 into the production database 120, such that the production database 120 mirrors the staging database 110.

While computer systems and methods have been particularly shown and described above with references to configurations thereof, it will be understood by those skilled in the art that various changes in form and details may be made therein without departing from the scope disclosed herein. Accordingly, embodiments disclosed herein are not intended to be limited by the example configurations provided above.

What is claimed is:

1. A method of collecting database transactions in a storage area network comprising:

receiving a dataset for storing in a staging database, the dataset containing network management data collected from a managed resource, wherein the dataset is comprised of a plurality of partitions;

disengaging a connection between the staging database and a production database;

storing the dataset in the staging database; and re-engaging the connection between the staging database and the production database by:

detecting when all partitions within the plurality of partitions have been successfully committed to the staging database;

releasing a lock on the production database such that modification to the production database is allowed; and re-starting a process of synchronizing the staging database with the production database.

2. The method of claim 1 wherein the dataset is comprised of a plurality of partitions and wherein receiving a dataset for storing in a staging database, the dataset containing network management data collected from a managed resource comprises:

receiving notification that a plurality of partitions is to be transmitted to the staging database.

3. The method of claim 1 wherein receiving a dataset for storing in a staging database, the dataset containing network management data collected from a managed resource comprises:

identifying a plurality of first tables within the production database that correspond to the dataset; and creating a plurality of second tables in the staging database that mirror the plurality of first tables within the production database.

4. The method of claim 1 wherein receiving a dataset for storing in a staging database, the dataset containing network management data collected from a managed resource comprises:

identifying a plurality of first tables within the production database that do not correspond to the dataset; and creating a plurality of alias tables in the staging database, the plurality of alias tables corresponding to the plurality of first tables in the production database.

5. The method of claim 1 wherein disengaging a connection between the staging database and a production database comprises:

locking the production database to prevent modification to the production database; and stopping a process of synchronizing the staging database with the production database.

6. The method of claim 1 wherein the dataset is comprised of a plurality of partitions and wherein storing the dataset in the staging database comprises:

for each partition within the plurality of partitions, performing the steps of:

i) receiving notification that transmission of the partition has begun;

ii) receiving notification that the transmission of the partition has successfully completed; and iii) committing the partition in the staging database.

7. The method of claim 1 wherein the dataset is comprised of a plurality of partitions and wherein storing the dataset in the staging database comprises:

for each partition within the plurality of partitions, performing the steps of:

i) receiving notification that transmission of the partition has begun;

ii) receiving notification that the transmission of the partition has not successfully completed;

iii) reversing any changes made to the staging database as a result of the transmission of the partition; and iv) transmitting a retry message to an agent, the retry message requesting that the partition that has not successfully completed be re-sent to the staging database.

8. The method of claim 1 wherein re-engaging the connection between the staging database and the production database comprises:

transmitting, from the staging database to the production database, the dataset stored in the staging database.

9. The method of claim 8 wherein transmitting, from the staging database to the production database, the dataset stored in the staging database comprises:

collecting a change dataset indicating a plurality of tables in the staging database that were modified as a result of receipt of the dataset at the staging database; and transmitting, from the staging database to the production database, data contained within the plurality of tables indicated by the change dataset.

10. The method of claim 8 wherein transmitting, from the staging database to the production database, the dataset stored in the staging database comprises:

receiving notification that an error has occurred during transmission of the dataset from the staging database to the production database;

reversing any changes made to the production database as a result of the transmission of the dataset from the staging database to the production database; and recording the error.

11. The method of claim 10 further comprising:

attempting to re-transmit from the staging database to the production database, the dataset stored in the staging database.

12. The method of claim 8 comprising:

setting a flag in the production database indicating the dataset transmitted to the production database originated from the staging database such that a process of synchronizing the staging database with the production database will not copy the dataset transmitted to the production database back to the staging database from which the dataset originated.

13. The method of claim 1 wherein re-engaging the connection between the staging database and the production database comprises:

receiving, at the staging database, a first dataset from the production database, the first dataset comprising data not previously contained within the staging database; and setting a flag in the staging database indicating the first dataset transmitted to the staging database originated from the production database such that a process of synchronizing the staging database with the production database will not copy the first dataset transmitted to the staging database back to the production database from which the first dataset originated.

14. A computerized device comprising:

a memory;

a processor;

a communications interface;

an interconnection mechanism coupling the memory, the processor and the communications interface;

wherein the memory is encoded with a database transaction collecting application that when executed on the processor is capable of collecting database transactions on the computerized device by performing the operations of:

receiving a dataset for storing in a staging database, the dataset containing network management data collected from a managed resource, wherein the dataset is comprised of a plurality of partitions;

disengaging a connection between the staging database and a production database;

storing the dataset in the staging database; and re-engaging the connection between the staging database and the production database by:

detecting when all Partitions within the plurality of Partitions have been successfully committed to the staging database;

releasing a lock on the production database such that modification to the production database is allowed; and re-starting a process of synchronizing the staging database with the production database.

15. The computerized device of claim 14 wherein the dataset is comprised of a plurality of partitions and wherein when the computerized device performs the operation of receiving a dataset for storing in a staging database, the dataset containing network management data collected from a managed resource, the computerized device is capable of performing the operation of:

receiving notification that a plurality of partitions is to be transmitted to the staging database.

16. The computerized device of claim 14 wherein when the computerized device performs the operation of disengaging a connection between the staging database and a production database, the computerized device is capable of performing the operation of:

locking the production database to prevent modification to the production database; and stopping a process of synchronizing the staging database with the production database.

17. The computerized device of claim 14 wherein the dataset is comprised of a plurality of partitions and wherein when the computerized device performs the operation of storing the dataset in the staging database, the computerized device is capable of performing the operation of:

for each partition within the plurality of partitions, performing the steps of:

i) receiving notification that transmission of the partition has begun;

ii) receiving notification that the transmission of the partition has successfully completed; and iii) committing the partition in the staging database.

18. The computerized device of claim 14 wherein the dataset is comprised of a plurality of partitions and wherein when the computerized device performs the operation of re-engaging the connection between the staging database and the production database, the computerized device is capable of performing the operation of:

detecting when all partitions within the plurality of partitions have been successfully committed to the staging database;

releasing a lock on the production database such that modification to the production database is allowed; and re-starting a process of synchronizing the staging database with the production database.

19. A computer readable storage medium encoded with computer programming logic that, when executed as a process on a processor in a computerized device, provides database transaction collecting, the medium comprising:

instructions for receiving a dataset for storing in a staging database, the dataset containing network management data collected from a managed resource, wherein the dataset is comprised of a plurality of partitions;

instructions for disengaging a connection between the staging database and a production database;

instructions for storing the dataset in the staging database; and instructions for re-engaging the connection between the staging database and the production database by:

detecting when all partitions within the plurality of partitions have been successfully committed to the staging database;

releasing a lock on the production database such that modification to the production database is allowed; and re-starting a process of synchronizing the staging database with the production database.

* * * * *